US008846239B2

(12) United States Patent
Park et al.

(10) Patent No.: US 8,846,239 B2
(45) Date of Patent: Sep. 30, 2014

(54) BATTERY MODULE

(75) Inventors: Shi-Dong Park, Yongin-si (KR);
Tae-Yong Kim, Yongin-si (KR);
Myung-Chul Kim, Yongin-si (KR)

(73) Assignees: Samsung SDI Co., Ltd., Yongin-Si, Gyeonggi-Do (KR); Robert Bosch GmbH, Stuttgart (DE)

( * ) Notice: Subject to any disclaimer, the term of this patent is extended or adjusted under 35 U.S.C. 154(b) by 475 days.

(21) Appl. No.: 13/067,173

(22) Filed: May 13, 2011

(65) Prior Publication Data
US 2012/0115015 A1    May 10, 2012

(30) Foreign Application Priority Data
Nov. 5, 2010    (KR) .................. 10-2010-0109804

(51) Int. Cl.
H01M 2/10    (2006.01)
H01M 10/02   (2006.01)
H01M 2/20    (2006.01)
H01M 2/22    (2006.01)
H01M 2/30    (2006.01)

(52) U.S. Cl.
CPC ................ *H01M 2/202* (2013.01); *H01M 2/20* (2013.01); *H01M 2/22* (2013.01); *H01M 2/30* (2013.01)
USPC ............ 429/161; 429/158; 429/159; 429/160

(58) Field of Classification Search
CPC ......... H01M 2/202; H01M 2/22; H01M 2/30; H01M 2/20
USPC .................................................. 429/160, 161
See application file for complete search history.

(56) References Cited

U.S. PATENT DOCUMENTS 6,146,788 A * 11/2000 Ikeda et al. .................. 429/160
2010/0124693 A1   5/2010 Kosugi et al.
2010/0266887 A1  10/2010 Sekino et al.

FOREIGN PATENT DOCUMENTS

| JP | 2000-182583 A | 6/2000 |
| JP | 2009-289429 | 12/2009 |
| JP | 2010-123299 A | 3/2010 |
| JP | 2010-205509 A | 9/2010 |
| JP | 2010-225449 A | 10/2010 |
| KR | 20-0429280 Y1 | 10/2006 |
| KR | 10-2010-0055477 | 5/2010 |

OTHER PUBLICATIONS

JP 2010225449—Translation.*
JP 2010205509—Translation.*
Korean Office action issued in related Korean Application No. 10-2010-0109804 (Park, et al.) on Feb. 29, 2012.

* cited by examiner

*Primary Examiner* — Ladan Mohaddes
(74) *Attorney, Agent, or Firm* — Lee & Morse, P.C.

(57) ABSTRACT

A battery module includes a plurality of rechargeable batteries having terminals, bus bars electrically connecting the terminals of the rechargeable batteries, connection parts protruding from the bus bars, and transmission wires electrically connecting the connection parts to a battery management system (BMS), the transmission wires being configured to transmit voltages of the rechargeable batteries to the BMS.

15 Claims, 6 Drawing Sheets

BATTERY MODULE

BACKGROUND

1. Field

The described technology relates generally to a battery module, and more particularly, to a battery module capable of easily checking current and voltage of a rechargeable battery.

2. Description of the Related Art

A rechargeable battery is a battery that can be charged and discharged, i.e., unlike a primary battery that is not chargeable. Low-capacity rechargeable batteries may be used for small-sized portable electronic devices, e.g., a portable phone, a notebook computer, and a camcorder, and high-capacity batteries may be widely used as power sources for driving motors, e.g., of hybrid cars and so on.

Recently, high-output rechargeable batteries using high-energy-density non-aqueous electrolytes have been developed, and the high-output rechargeable batteries are formed as high-capacity battery modules by connecting a plurality of rechargeable batteries in series. Such battery modules may be used to drive an apparatus requiring a large amount of power, e.g., motors of electrical cars.

A battery module may include a plurality of rechargeable batteries connected in series, and each rechargeable battery may be formed, e.g., in a cylindrical shape, a prismatic shape, etc. The rechargeable battery may be connected to a BMS (battery management system) to detect and manage a charge voltage.

The above information disclosed in this Background section is only for enhancement of understanding of the background of the described technology and therefore it may contain information that does not form the prior art that is already known in this country to a person of ordinary skill in the art.

SUMMARY

An exemplary embodiment provides a battery module. The battery module may include a plurality of rechargeable batteries having terminals, bus bars electrically connecting the terminals of the rechargeable batteries, connection parts protruding from the bus bars, and transmission wires electrically connecting the connection parts to a BMS, the transmission wires being configured to transmit voltages of the rechargeable batteries to the BMS.

Each connection part may include a connection protrusion extending from a side of a respective bus bar.

The connection part may further include a wire socket connected to the connection protrusion, the wire socket being configured to grip a transmission wires inserted thereinto.

The wire socket may include a combination part connected to the connection protrusion and to a support plate by a bolt, and a pressed fixation part extending from the combination part and configured to grip the transmission wire therein.

The connection protrusions may be connected to a support plate by a bolt.

Each of the connection protrusions may protrude from a longitudinal side of a corresponding bus bar, the bus bar electrically connecting two rechargeable batteries.

Each of the connection protrusions may protrude from a longitudinal side of a corresponding bus bar, the bus bar electrically connecting four rechargeable batteries.

The battery module may further include a protecting member positioned between the bus bars and the rechargeable batteries.

The battery module may further include a housing holding the rechargeable batteries, the protecting member being mounted on the housing.

The protecting member may include a support plate with holes, the support plate being on the rechargeable batteries, and the holes penetrating the support plate to expose the terminals of the rechargeable batteries.

The battery module may further include guide members on the support plate, the guide members being configured to guide the transmission wires to the BMS.

The guide members may include bent portions of the support plate that define holes, the transmission wires being inserted through the holes of the guide members to be guided toward the BMS.

The plurality of guide members may be linearly disposed on an upper surface of the support plate toward the BMS.

The connection parts may be separated from the support plate to have a height corresponding to positions of the holes of the guide members.

The battery module may further include gas exhaust holes in the protecting member, the gas exhaust holes being positioned on gas exhaust members of the rechargeable batteries.

Surfaces of the bus bars may be coated with tin.

The battery module may further include a support plate covering a top of the battery module, each bus bar being connected to the support plate via a respective connection part.

Each transmission wire may be connected to the corresponding bus bar via a combination hole in the respective connections part.

BRIEF DESCRIPTION OF THE DRAWINGS

The above and other features and advantages will become more apparent to those of ordinary skill in the art by describing in detail exemplary embodiments with reference to the attached drawings, in which.

DETAILED DESCRIPTION

Figure 1:
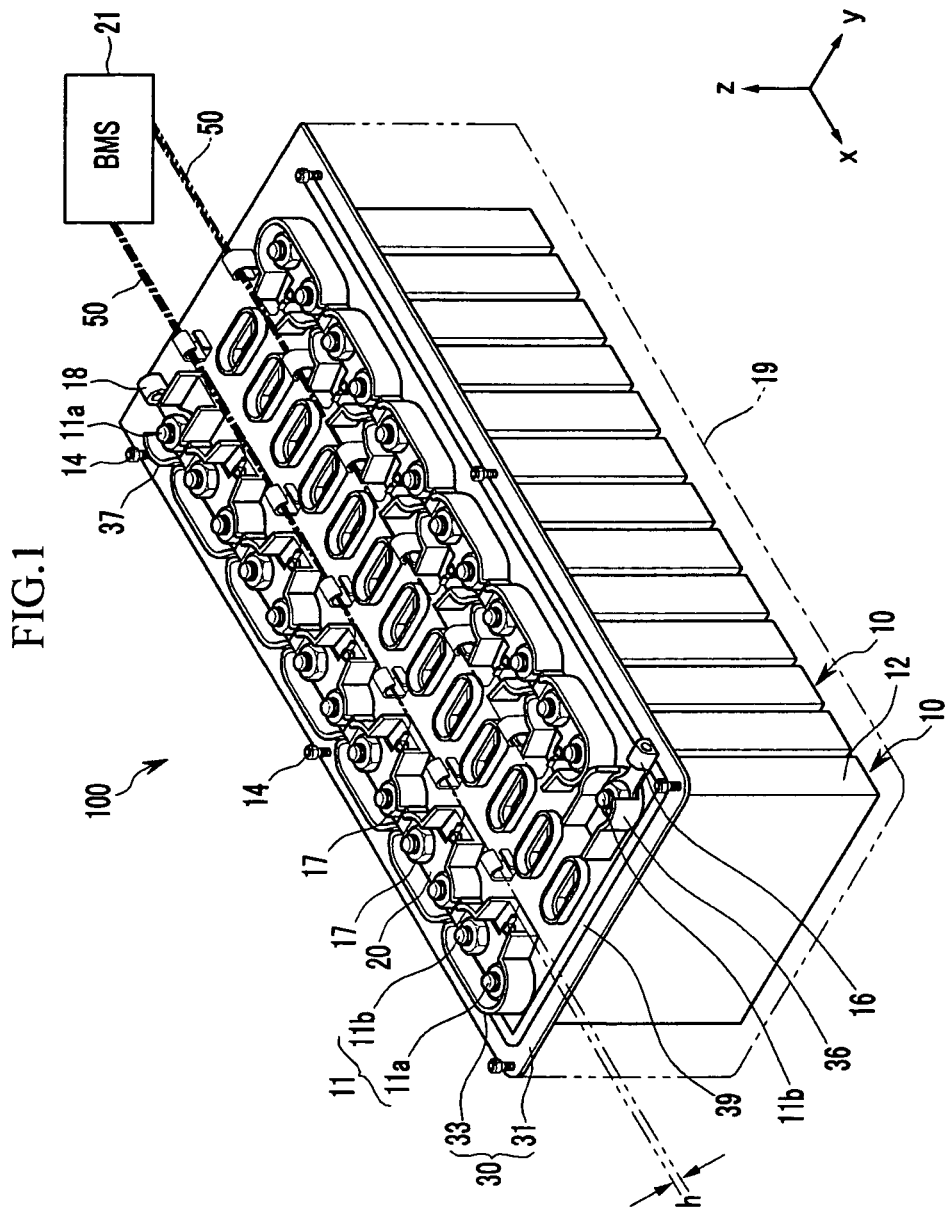
FIG. 1 illustrates a perspective schematic view of a battery module according to a first exemplary embodiment.

Korean Patent Application No. 10-2010-0109804, filed on Nov. 5, 2010, in the Korean Intellectual Property Office, and entitled: "Battery Module," is incorporated by reference herein in its entirety.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the invention to those skilled in the art.

In the drawing figures, the dimensions of layers and regions may be exaggerated for clarity of illustration. It will also be understood that when a layer (or element) is referred to as being "on" another layer or substrate, it can be directly on the other layer or substrate, or intervening layers may also be present. In addition, it will also be understood that when a layer is referred to as being "between" two layers, it can be the only layer between the two layers, or one or more intervening layers may also be present. Like reference numerals refer to like elements throughout.

Figure 2:
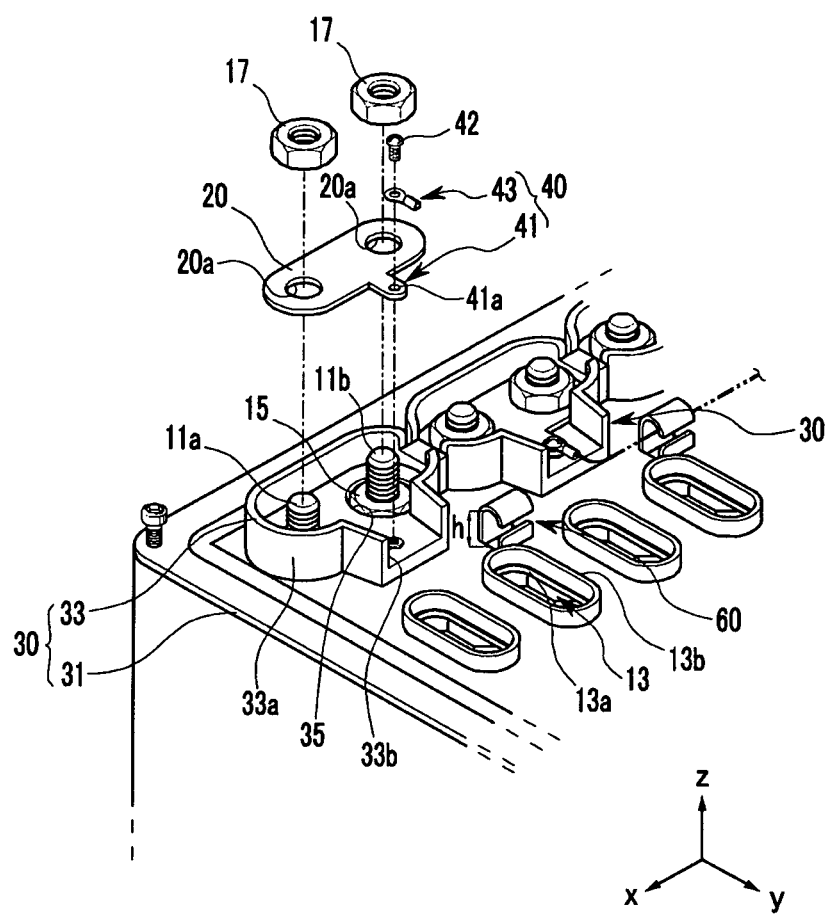
FIG. 2 illustrates an enlarged partial perspective view of a part of FIG. 1.

FIG. 1 illustrates a schematic perspective view of a battery module according to a first exemplary embodiment. FIG. 2 illustrates an enlarged partial perspective view of FIG. 1.

As shown in FIGS. 1 and 2, a battery module 100 according to the first exemplary embodiment may include a plurality of rechargeable batteries 10 having terminals 11 protruding outward, a plurality of bus bars 20 electrically connecting the terminals 11 of the rechargeable batteries 10, connection parts 40 protruding from sides of the bus bars 20, transmission wires 50 electrically connecting the connection parts 40 and transmitting voltage of the rechargeable batteries 10 to a BMS (battery management system) 21, and a protecting member 30 positioned between the bus bars 20 and the rechargeable batteries 10.

A case where the rechargeable batteries 10 are prismatic lithium ion rechargeable batteries will be described as an example. However, example embodiments are not limited thereto and are applicable to various forms of batteries, e.g., lithium polymer batteries or cylindrical batteries.

A rechargeable battery 10 may include a case 12 holding an electrode assembly (not shown), and terminals 11 protruding from the electrode assembly and outward from the case 12. Also, the rechargeable battery 10 may further include a gas exhaust member 13 having a notch which may open at a set pressure to exhaust a gas. The terminals 11 may include a positive electrode terminal 11a electrically connected to a positive electrode of the electrode assembly, and a negative electrode terminal 11b electrically connected to a negative electrode of the electrode assembly. For example, the case 12 may be formed of metal, e.g., aluminum, an aluminum alloy, etc., and may have a prismatic shape, e.g., a rectangular parallelepiped shape.

The plurality of rechargeable batteries 10 may be arranged adjacent to each other, e.g., may be stacked in a line in one direction (an x-axis direction of FIG. 1), such that major surfaces of the rechargeable batteries 10 may face each other. For example, the rechargeable batteries 10 may be arranged so terminals 11 of adjacent rechargeable batteries 10 may have alternating polarities. The plurality of rechargeable batteries 10 may be arranged in a housing 19.

The rechargeable batteries 10 may be connected in series by the bus bars 20, e.g., the rechargeable batteries 10 may be connected in series by connecting terminals 11 of adjacent rechargeable batteries 10. For example, each bus bar 20 may be connected to the positive electrode terminal 11a of one rechargeable battery 10 and to the negative electrode terminal 11b of a neighboring rechargeable battery 10 at a state in which the positive electrode terminals 11a and the negative electrode terminals 11b of the neighboring rechargeable batteries 10 are alternately arranged. In another example, in the case in which the rechargeable batteries 10 are disposed to have terminals of a same polarity lie next to each other, e.g., all positive terminals 11a may be aligned at one side of the battery module 100 and all negative terminals 11b may be aligned at an opposite side of the battery module 100, the bus bars 20 may connect the rechargeable batteries 10 to each other in parallel.

Referring to FIG. 2, holes 20a may be formed in edges of a bus bar 20 in the longitudinal direction to allow the terminals 11 to be inserted therethrough. The bus bar 20 may be mounted on a base member 15 put on the terminal 11, and the bus bar 20 may be fixed to the terminal 11 by a nut 17. In this case, the base member 15 may include a nut fastened to the terminal. As described above, a lower surface of the bus bar 20 may contact the base member 15 and an upper surface of the bus bar 20 may contact the nut 17.

The protecting member 30 may include a support plate 31 having a plate shape, and a plurality of protruding parts 33 protruding through the support plate 31. The protruding parts 33 may be formed around circumferences of the bus bars 20.

As shown in FIG. 1, the support plate 31 may have a shape corresponding to the battery module 100, e.g., a substantially rectangular plate shape, and may be combined with an opening of the housing 19, e.g., the support plate 31 may be fixed to the housing 19 by a bolt 14. The support plate may overlap an entire opening of the housing 19, so holes 35 may be formed in the support plate 31 to allow the terminals 11 to be inserted therethrough. The positive and negative terminals 11a and 11b of two adjacent rechargeable batteries 10 may extend through two adjacent holes 35 of the support plate 31, so the bus bar 20 may be inserted onto the positive and negative terminals 11a and 11b to provide serial connection and overlap the holes 35. One protruding part 33 surrounds the two adjacent holes 35 with the connected terminals inserted therethrough.

The protruding part 33 may include a protecting protrusion 33a having a rib shape surrounding a bus bar 20, and a guide protrusion 33b formed to extend from both ends of the protecting protrusion 33a toward the center in the width direction of the support plate 31. In detail, the protecting protrusion 33a may include arc-shaped parts formed at the both edges and a linear part connecting the arc-shaped parts to surround the bus bar 20. Therefore, it may be possible to prevent or substantially minimize short circuits between adjacent, i.e., neighboring, bus bars 20, and to prevent or substantially minimize the terminals 11 or the bus bars 20 from being electrically connected to an external conductor, e.g., a tool during work. The guide protrusion 33b functions to protect a wire connected to a terminal 11 or a bus bar 20 for measuring a current and voltage, as will be discussed in more detail below.

As illustrated in FIG. 1, current output terminals 16 and 18 for outputting current to the outside may be provided at opposite ends of the battery module 100 to correspond to respective positive and negative terminals 11a and 11b. The positive and negative terminals 11a and 11b connected to the current output terminals 16 and 18 may not be connected to any bus bar 20, and rib-shaped protruding parts 36 and 37 may protrude from the support plate 31 to surround terminals 11a and 11b, respectively, for protection.

A reinforcing rib 39 may be formed to protrude along an edge on the support plate 31. The reinforcing rib 39 prevents or substantially minimizes the support plate 31 from being deformed or damaged, e.g., due to an external impact, etc.

Referring to FIG. 2, gas exhaust holes 13a may be formed in the support plate 31, and the gas exhaust holes 13a may be positioned on the gas exhaust members 13 of the rechargeable batteries 10. Gas protrusions 13b may be formed along circumferences of the gas exhaust holes 13a, i.e., to extend along and surround the gas exhaust holes 13a. Therefore, when the gas exhaust members 13 are opened, an internal gas of the rechargeable batteries 10 may be rapidly exhausted through the gas exhaust holes 13a and the gas exhaust protrusions 13b.

As illustrated in FIG. 2, the connection part 40 may protrude from a side of a bus bar 20. The connection part 40 is a member for connecting to the rechargeable battery 10 the transmission wire 50 for measuring current and voltage of the rechargeable battery 10. The connection part 40 may include a connection protrusion 41 protruding from a side of the bus bar 20 and a wire socket 43 connected to the connection protrusion 41 and for fixing the transmission wire 50.

The connection protrusion 41 may protrude from the bus bar 20, e.g., from a central position along a lateral longitudinal side of the bus bar 20. The connection protrusion 41 may be positioned at any angle with respect to the longitudinal direction of the bus bar 20, e.g., the connection protrusion 41 may be perpendicular to the longitudinal direction of the bus bar 20, thereby connecting the transmission wire 50 at any angle to the bus bar 20.

The connection protrusion 41 may include a combination hole 41*a* at its edge, i.e., at a terminal end, so the combination hole 41*a* and the bus bar 20 may be at opposite ends of the connection protrusion 41. The combination hole 41*a* may be combined with a bolt member 42. Therefore, the connection protrusion 41 of the bus bar 20 may be reliably fixed, i.e., connected, by the bolt member 42 through the combination hole 41*a* to the support plate 31. As a result, the bus bar 20 may be stably fixed at its position and may avoid, e.g., shaking due to an external impact, etc. Further, the bus bar 20 may reliably transmit the current and voltage of the rechargeable battery 10 to the BMS 21 through the transmission wire 50.

In the first exemplary embodiment, a case where one combination hole 41*a* is formed in the connection protrusion 41 has been described as an example, but two or more combination holes may be formed. If two or more combination holes 41*a* are formed in the connection protrusion 41, the connection between the bus bar 20 and the support plate 31 may be more reliable.

The wire socket 43 may be used for connecting the transmission wire 50, and may be combined with the connection protrusion 41. The wire socket 43 will be described in more detail with reference to FIG. 3.

Figure 3:
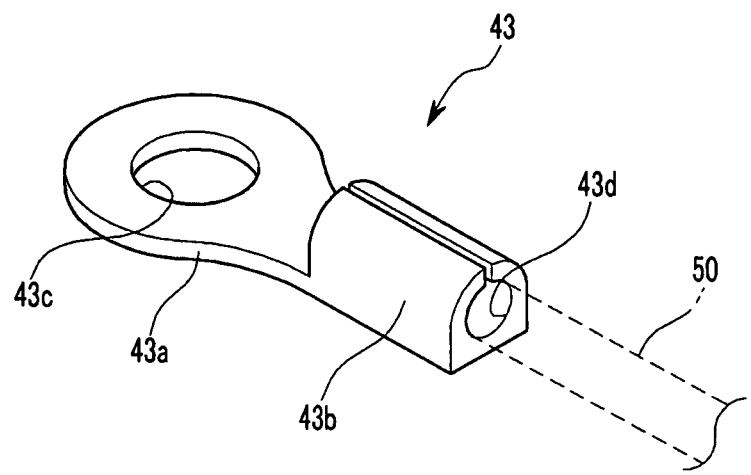
FIG. 3 illustrates a schematic enlarged view of a wire socket according to an example embodiment.

FIG. 3 illustrates an enlarged view of the wire socket 43. As shown in FIG. 3, the wire socket 43 may include a combination part 43*a* and a pressed fixation part 43*b*.

Referring to FIG. 3, the combination part 43*a* refers to a part, e.g., directly, connected with the connection protrusion 41. That is, the combination part 43*a* may include a through-hole 43*c*, so the through-hole 43*c* may be aligned with and connected to the combination hole 41*a* of the connection protrusion 41 via the bolt member 42 to the support plate 31. The combination part 43*a* and the connection protrusion 41 may be connected by fastening the bolt member 42 in a state in which the through-hole 43*c* and the combination hole 41*a* are connected with each other.

The pressed fixation part 43*b* may be formed to protrude as one body with the combination part 43*a*. That is, the pressed fixation part 43*b* may be integral with the combination part 43*a*, and may extend, e.g., linearly, from the combination part 43*a*. A part of the transmission wire 50 may be inserted into and fixed by the pressed fixation part 43*b*. In detail, a part of the pressed fixation part 43*b* may be curved in the longitudinal direction thereof to form a pressed hole 43*d*. Therefore, if a part of the transmission wire 50 is inserted into the pressed hole 43*d* of the pressed fixation part 43*b* and then the pressed fixation part 43*b* is pressed to reduce the diameter of the pressed hole 43*d*, the transmission wire 50 may be reliably combined with, e.g., gripped by, the pressed fixation part 43*b*. In other words, the pressed fixation part 43*b* may have sidewalls, e.g., flexible sidewalls, surrounding a hollow tunnel, i.e., the pressed hole 43*d*, so the transmission wire 50 may be inserted through the hollow tunnel, i.e., through the pressed hole 43*d*, followed by pressing the sidewalls of the pressed fixation part 43*b*. Pressing the sidewalls of the pressed fixation part 43*b* may minimize the diameter of the pressed hole 43*d*, thereby securing the sidewalls of the pressed fixation part 43*b* firmly around the transmission wire 50 in the pressed hole 43*d*.

The connection part 40 may be positioned at a predetermined height h from an upper surface of the support plate 31, such that the transmission wires 50 may be separated from the support plate 31 by the predetermined distance. This is for preventing the transmission wire 50 from being brought into contact with the support plate 31.

As shown in FIG. 1, the transmission wires 50 may be connected to the bus bars 20 via the connection parts 40, and may transmit the current and voltage of the rechargeable batteries 10 to the BMS 21. One transmission wire 50 may connect one bus bar 20 to the BMS 21. That is, the transmission wires 50 may include a plurality of wires, i.e., a number of the transmission wires 50 may equal the number of the bus bars 20, connected to the BMS 21. This is for enabling the BMS 21 to separately sense the voltage and current of the rechargeable battery 10 connected to each bus bar 20. The configuration and operation of the BMS 21 is well-known, and thus, a description thereof will be omitted below.

Figure 4:
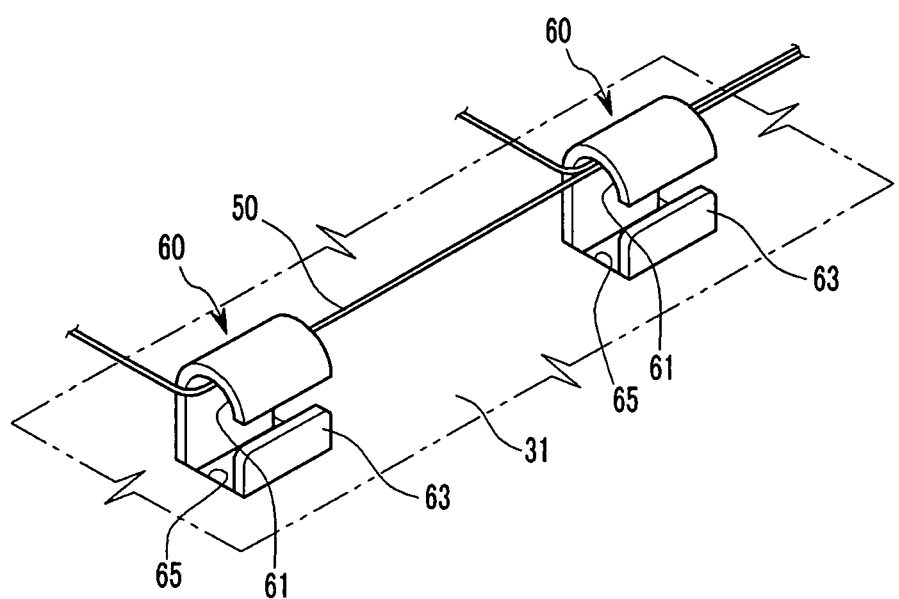
FIG. 4 illustrates a schematic enlarged view of a guide member according to an example embodiment.

The transmission wires 50 may be guided toward the BMS 21 by guide members 60, as will be described in more detail with reference to FIG. 4. FIG. 4 illustrates an enlarged view of the guide members 60.

As shown in FIG. 4, the guide members 60 may be formed by slitting parts of the support plate 31 and bending the slit parts into shapes of holes 61 having an opening on one side. That is, portions of the support plate 31 may be cut to form the slit parts, and the slit parts may be curved above openings 65 to define the holes 61, e.g., the holes 61 may be positioned at the height h to be at a same height level as the connection parts 40. As such, the transmission wires 50 may be inserted through the holes 61 of the guide members 60 to be guided between the BMS 21 and respective bus bars 20. Reference numeral 63 denotes protectors for preventing foreign substances from flowing into the openings 65 in the support plate 31.

The plurality of guide members 60 may be linearly disposed on the upper surface of the support plate 31 along the longitudinal direction of the battery module 100. Therefore, the guide members 60 may reliably guide the transmission wires 50 toward the MBS 21, while preventing interference with adjacent components.

Tinning may be performed on the bus bars 20 of the first exemplary embodiment to coat the surfaces thereof. Coating of the surfaces of the bus bars 20 with tin may make contact resistance conditions between the bus bars 20 and the terminals 11 substantially the same, so as to sense the currents and voltages of the rechargeable batteries 10 more accurately.

Figure 5:
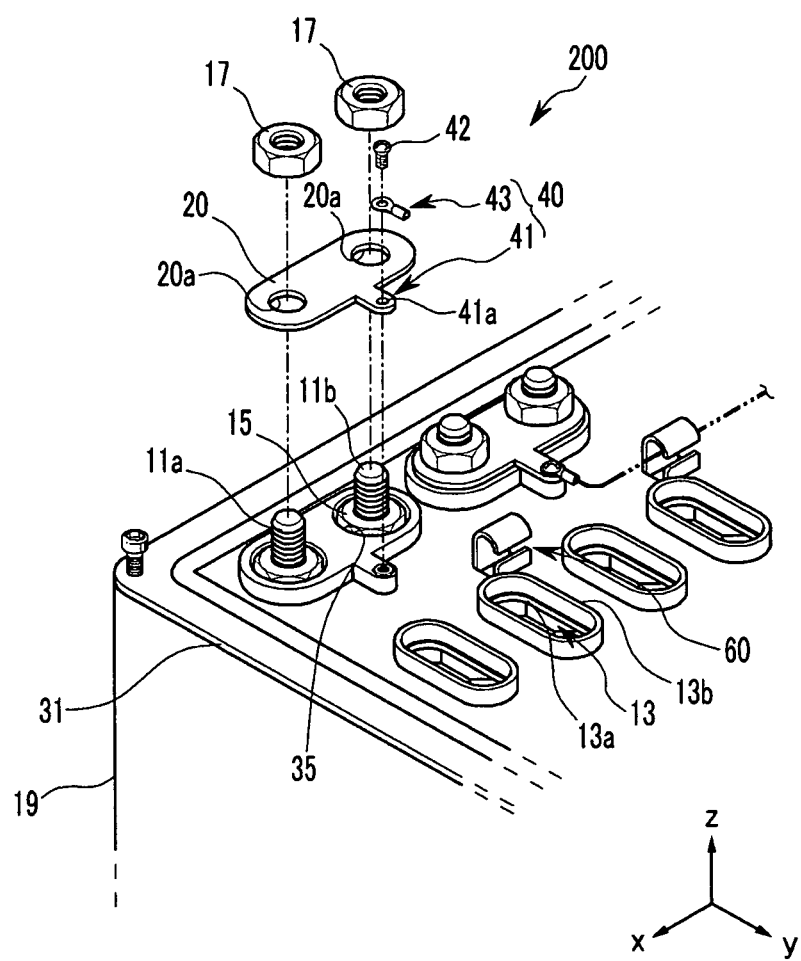
FIG. 5 illustrates a perspective schematic view of a part of a battery module according to a second exemplary embodiment.

FIG. 5 illustrates a partial perspective view of a battery module according to a second exemplary embodiment. The identical reference numerals as those in FIGS. 1 to 4 denote identical elements, and therefore, detailed description thereof may not be repeated.

Referring to FIG. 5, in a battery module 200 according to the second exemplary embodiment, the bus bars 20 may not include the protruding parts 33 of the first exemplary embodiment. Therefore, according to the battery module 200 of the second exemplary embodiment, it may be possible to use spaces corresponding to the protruding parts 33 and to improve a degree of freedom of design.

Figure 6:
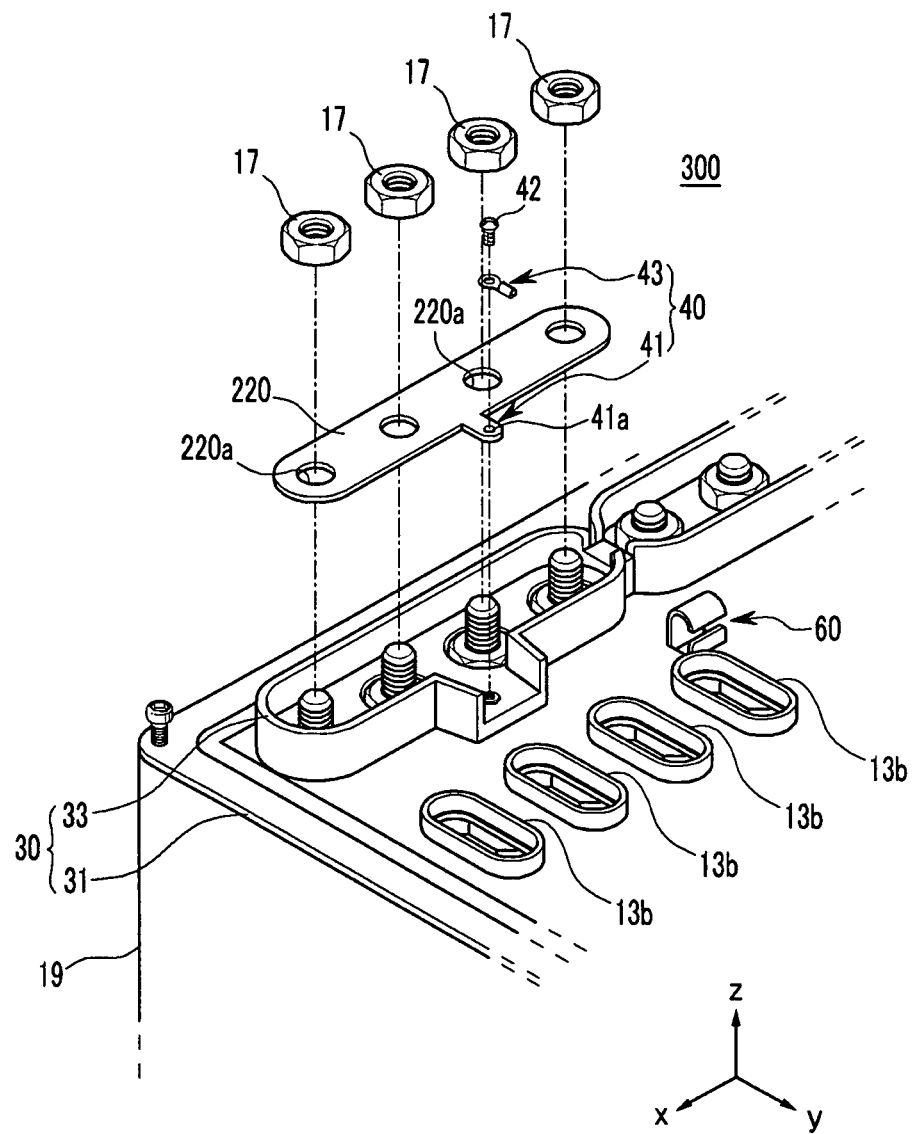
FIG. 6 illustrates a schematic perspective view of a part of a battery module according to a third exemplary embodiment.

FIG. 6 illustrates a partial perspective view of a battery module according to a third exemplary embodiment. The identical reference numerals as those in FIGS. 1 to 5 denote identical elements, and therefore, detailed description thereof may not be repeated.

As shown in FIG. 6, in a battery module 300 according to the third exemplary embodiment, four rechargeable batteries 10 may be electrically connected to each other by one bus bar 220. More specifically, the bus bar 220 may connect in parallel two pairs of serially connected rechargeable batteries 10. That is, two rechargeable batteries 10 may be disposed to have the positive electrode terminals 11a thereof next to each other, and two additional rechargeable batteries 10 may be disposed to have the negative electrode terminals 11b thereof next to each other. For this, four holes 220a may be formed in the bus bar 220, and the terminals 11a and 11b may be inserted into the holes 220a. Nuts 17 may be combined with the terminals 11a and 11b in the state in which the bus bar 220 is mounted on the terminals 11a and 11b, thereby fixing the bus bar 220 to the terminals 11a and 11b.

According to the exemplary embodiments, a battery module may include a connection part extending from the bus bar. As such, the transmission wire may be connected to the connection part to transmit voltage and current of the rechargeable battery to the BMT, thereby preventing faulty connection of the transmission wire and perform a reliable connection. In contrast, a conventional rechargeable battery may have a complicated and an unreliable connection to the BMS, thereby causing a faulty connection.

Example embodiments have been described above with reference to the exemplary embodiments shown in the drawings. However, example embodiments are not limited thereto but various modifications or other exemplary embodiments included within the spirit and scope of the example embodiments will be apparent to those skilled in the art. Accordingly, the actual scope of example embodiments are intended to be defined by the following claims.

| <Description of symbols> | | | |
|---|---|---|---|
| 10 | Rechargeable battery | 11 | Terminal |
| 11a | Positive electrode terminal | 11b | Negative electrode terminal |
| 12 | Case | 13 | Gas exhaust member |
| 13a | Gas exhaust hole | 13b | Gas exhaust protrusion |
| 14 | Bolt | 15 | Base member |
| 17 | Nut | 19 | Housing |
| 20 | Bus bar | 20a | Hole |
| 21 | BMS | 30 | Protecting member |
| 31 | Support plate | 33 | Protruding part |
| 40 | Connection part | 41 | Connection protrusion |
| 41a | Combination hole | 43 | Wire socket |
| 43a | Combination part | 43b | Pressed fixation part |
| 50 | Transmission wire | 60 | Guide member |
| 63 | Protector | 65 | Opening |

What is claimed is:

1. A battery module, comprising:
a plurality of rechargeable batteries having terminals;
bus bars electrically connecting the terminals of the rechargeable batteries;
connection parts protruding from the bus bars; and
transmission wires electrically connecting the connection parts to a battery management system (BMS), the transmission wires being configured to transmit voltages of the rechargeable batteries to the BMS, wherein each connection part includes a connection protrusion extending from a side of a respective bus bar, the connection protrusion being connected to a support plate by a bolt,
wherein the connection part further comprises a wire socket connected to the connection protrusion, the wire socket being configured to grip the transmission wires inserted thereinto.

2. The battery module as claimed in claim 1, wherein the wire socket includes: a combination part connected to the connection protrusion and to the support plate by a bolt; and a pressed fixation part extending from the combination part and configured to grip the transmission wire therein.

3. The battery module as claimed in claim 1, wherein each of the connection protrusions protrudes from a longitudinal side of a corresponding bus bar, the bus bar electrically connecting two rechargeable batteries.

4. The battery module as claimed in claim 1, wherein each of the connection protrusions protrudes from a longitudinal side of a corresponding bus bar, the bus bar electrically connecting four rechargeable batteries.

5. The battery module as claimed in claim 1, further comprising a protecting member positioned between the bus bars and the rechargeable batteries.

6. The battery module as claimed in claim 5, further comprising a housing holding the rechargeable batteries, the protecting member being mounted on the housing.

7. The battery module as claimed in claim 5, wherein the protecting member includes the support plate, the support plate being on the rechargeable batteries, and the support plate having holes penetrating the support plate to expose the terminals of the rechargeable batteries.

8. The battery module as claimed in claim 7, further comprising guide members on the support plate, the guide members being configured to guide the transmission wires to the BMS.

9. The battery module as claimed in claim 8, wherein the guide members include bent portions of the support plate that define holes, the transmission wires being inserted through the holes of the guide members to be guided toward the BMS.

10. The battery module as claimed in claim 8, wherein the guide members are linearly disposed on an upper surface of the support plate toward the BMS.

11. The battery module as claimed in claim 10, wherein the connection parts are separated from the support plate to have a height corresponding to positions of the holes of the guide members.

12. The battery module as claimed in claim 5, further comprising gas exhaust holes in the protecting member, the gas exhaust holes being positioned on gas exhaust members of the rechargeable batteries.

13. The battery module as claimed in claim 1, wherein surfaces of the bus bars are coated with tin.

14. The battery module as claimed in claim 1, wherein the support plate covers a top of the battery module, each bus bar is connected to the support plate via a respective connection part.

15. The battery module as claimed in claim 14, wherein each transmission wire is connected to the corresponding bus bar via a combination hole in the respective connection part.

* * * * *